United States Patent
Wiechmann et al.

[11] Patent Number: 6,009,110
[45] Date of Patent: Dec. 28, 1999

[54] PULSE AMPLITUDE CONTROL IN FREQUENCY-CONVERTED LASERS

[75] Inventors: Werner H. Wiechmann, Santa Clara; Jeffrey D. Kmetec, Palo Alto; Frank J. Adams, Los Altos, all of Calif.

[73] Assignee: Lightwave Electronics Corporation, Mountain View, Calif.

[21] Appl. No.: 09/038,811

[22] Filed: Mar. 11, 1998

[51] Int. Cl.[6] .................................................. H01S 3/11
[52] U.S. Cl. ............................ 372/10; 372/25; 372/22
[58] Field of Search ........................... 372/69, 25, 10, 372/26, 11–13, 22, 82, 9, 32

[56] References Cited

U.S. PATENT DOCUMENTS

| | | | |
|---|---|---|---|
| 4,019,159 | 4/1977 | Hon et al. | 332/7.51 |
| 4,337,442 | 6/1982 | Mauck | 372/13 |
| 5,016,251 | 5/1991 | D'Arcy | 372/10 |
| 5,128,601 | 7/1992 | Orbach et al. | 372/30 |
| 5,157,676 | 10/1992 | Wilcox | 372/29 |
| 5,157,677 | 10/1992 | Narhi et al. | 372/13 |
| 5,168,503 | 12/1992 | Maeda | 372/22 |
| 5,226,051 | 7/1993 | Chan et al. | 372/30 |
| 5,291,505 | 3/1994 | Nielson | 372/38 |
| 5,339,323 | 8/1994 | Hunter et al. | 372/25 |
| 5,365,532 | 11/1994 | Klaras et al. | 372/10 |
| 5,383,209 | 1/1995 | Hwang | 372/22 |
| 5,399,323 | 3/1995 | Hunter et al. | 372/25 |
| 5,671,232 | 9/1997 | Lee et al. | 372/22 |

*Primary Examiner*—Leon Scott, Jr.
*Attorney, Agent, or Firm*—Lumen Intellectual Property Services

[57] ABSTRACT

Pulse recovery times are reduced in a pulsed intracavity frequency-converted laser by operating the laser in a continuous-wave (c.w.) mode before operation in a Q-switched mode. C.w. light locally optically heats the frequency-conversion optics of the laser to facilitate phase-matching at the beginning of Q-switched operation. C.w. operation also reduces the amplitude of the first pulse of the subsequent firing sequence by expending population inversion accumulating in the gain medium. Operation in c.w. mode is initiated by ramping up the net optical gain in the laser cavity when the time elapsed since the latest emitted pulse exceeds 110% of the interpulse spacing prior to the latest pulse. Initiation of c.w. operation does not require external signals other than optionally a pulse trigger sequence from the user. Cavity optical losses may be increased immediately prior to the first pulse, for accumulating population inversion and increasing the first pulse to a desired level. Frequency doubling and tripling lithium triborate (LBO) crystals were used with a Nd-YAG solid state medium to generate ultraviolet light at 355 nm from infrared light at 1064 nm.

31 Claims, 4 Drawing Sheets

PULSE AMPLITUDE CONTROL IN FREQUENCY-CONVERTED LASERS

FIELD OF THE INVENTION

The present invention relates to pulsed frequency-converted lasers, and in particular to a system and method for controlling pulse amplitudes in a frequency-converted laser.

BACKGROUND OF THE INVENTION

Frequency-converted lasers are used in a variety of applications and systems, including for example materials processing and micromachining applications. The laser usually operates in a pulsed mode to generate pulsed frequency-converted light, which is the useful output of the laser. The user may need to turn off the useful output of the laser between firing sequences, for example to allow a new object to be positioned in front of the laser. The useful output may be turned off by increasing the optical losses within the resonant cavity to inhibit lasing.

Initiating lasing after a period of laser operation in an "off" state may lead to suboptimal laser operation at early time points in a subsequent firing sequence. In particular, the first pulse may have a very high amplitude, and can cause damage to the object to be processed. Moreover, the pulses emitted subsequently to the first pulse may have low amplitudes for a period of time. Such low-amplitude pulses may not be suitable for adequately processing the object of interest. Generating pulses of uniform high amplitudes at early time points may help improve system throughput and the quality of processed objects.

OBJECTS AND ADVANTAGES OF THE INVENTION

It is a primary object of this invention to provide an intracavity frequency-converted laser having reduced pulse recovery times. It is another object to provide a laser allowing reduced first pulse amplitudes. Another object is to provide a laser having relatively simple electronics for suppressing first pulses.

SUMMARY OF THE INVENTION

An intracavity frequency-converted laser is operated in a continuous-wave (c.w.) mode during periods when no useful output is desired. Operation in a c.w. mode serves to reduce the pulse recovery time of the laser for a subsequent period of operation in a Q-switched mode, by locally optically heating frequency-conversion optics of the laser. The localized optical heating facilitates phase-matching within the frequency-conversion optics. The amplitudes of the pulses of frequency-converted light generated at the start of Q-switched operation are then similar to the amplitudes during steady-state Q-switched operation. Operation in a c.w. mode also serves to reduce the amplitude of the first pulse emitted during Q-switched operation, by expending excess population inversion which could otherwise accumulate within the gain medium.

According to another aspect of the invention, operation in a c.w. mode is initiated by comparing the time elapsed since emission of the latest pulse with a predetermined threshold, e.g. 110% of the interpulse spacing immediately previous to the latest pulse. If the elapsed time exceeds the threshold, the net optical gain within the laser is ramped up to initiate c.w. lasing. Initiating operation in a c.w. mode by simply comparing the elapsed time to a predetermined threshold allows the use of relatively simple control electronics, and does not require external first-pulse-suppression signals.

DESCRIPTION OF THE FIGURES

FIG. 2-A is a schematic diagram of the control electronics of the preferred laser of FIG. 1.

FIG. 2-B is a schematic diagram of the timing and triggering components of the control electronics of FIG. 2-A.

FIG. 3-A illustrates schematically two sequences of pulse triggers, separated by a pause, used to generate pulsed frequency-converted light in the system of FIG. 1.

FIG. 3-B illustrates schematically the RF power sent to the AOM of FIG. 1, corresponding to the sequences of FIG. 3-A.

FIG. 3-C illustrates schematically the intracavity fundamental-frequency power for the system of FIG. 1, corresponding to the sequences of FIG. 3-A.

FIG. 3-D illustrates schematically the third-harmonic output power for the system of FIG. 1, corresponding to the sequences of FIG. 3-A.

FIG. 4-A illustrates a measured third-harmonic pulse sequence envelope following a period in an off-state for a system similar to that shown in FIG. 1.

FIG. 4-B illustrates a measured third-harmonic pulse sequence envelope following a period of operation in a continuous-wave state for the system of FIG. 1.

DETAILED DESCRIPTION

System Description

Figure 1:
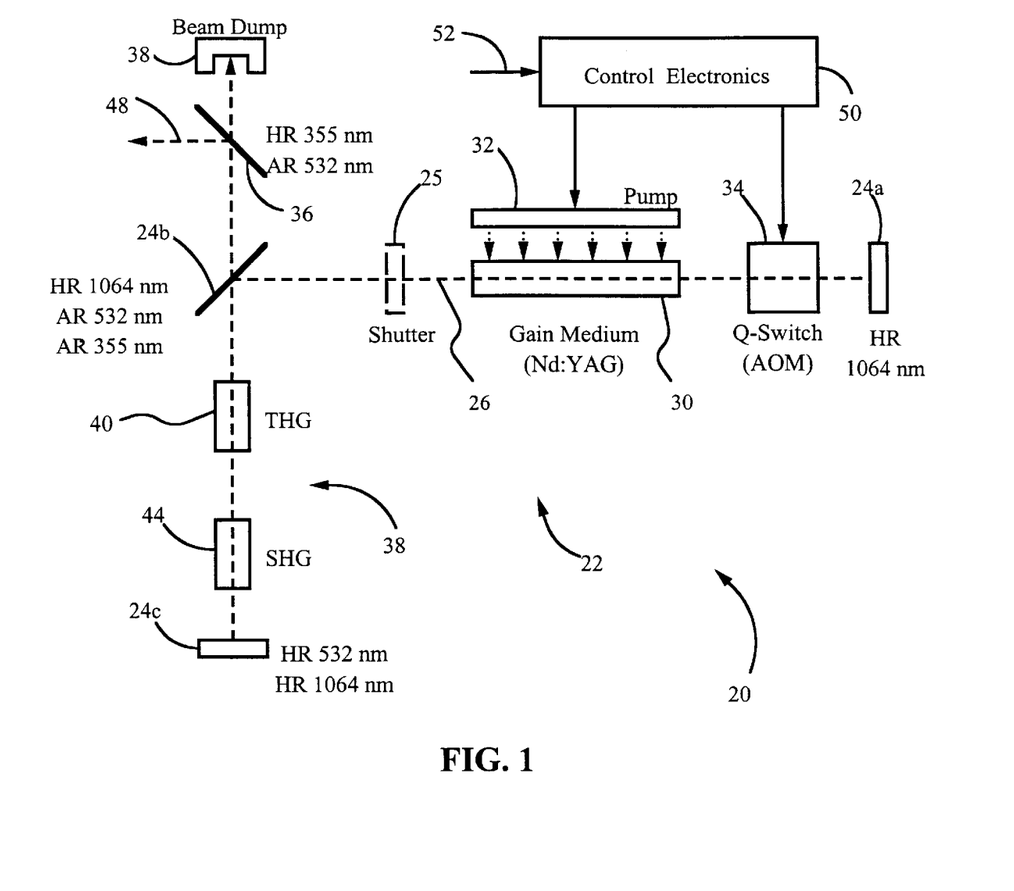
FIG. 1 is schematic diagram of a preferred frequency-converted laser of the present invention.

The following description of a presently preferred embodiment illustrates the invention by way of example, and not necessarily by way of limitation. FIG. 1 is a schematic diagram of a Q-switched, intracavity frequency converted laser 20 according to a preferred embodiment of the present invention. Laser 20 generates light of a third harmonic frequency (e.g. 355 nm) by frequency-converting light of a fundamental frequency (e.g. 1064 nm). System 20 comprises a resonant cavity 22 defined by mirrors 24a–c. Mirrors 24a–c have high reflectivities (>99.9) for light of the fundamental frequency (1064 nm). Mirror 24c has a high reflectivity for second harmonic light (532 nm). Mirror 24b is anti-reflection (AR) coated for second and third harmonic light (532 nm and 355 nm). Generally, the dimensions (e.g. radii), reflectivities, and spacings of mirrors 24a–c are chosen such that cavity 22 is a resonator capable of supporting light of the fundamental frequency.

A light beam 26 of the fundamental frequency is generated by an active gain medium 30 situated within cavity 22. Gain medium 30 is optically pumped by a diode pump 32 for generating population inversion within gain medium 30. Gain medium 30 is preferably a solid state medium such as a Nd-YAG rod, optically side pumped at 808 nm. Other suitable gain media include Nd:YLF, Nd:YVO$_4$, Nd:YALO, Ruby Titanium Sapphire, and CrLiSAF. Non-linear frequency-conversion optics 38 are situated within cavity 22, in an optical path between gain medium 30 and mirror 24c. Frequency-conversion optics 38 generate frequency-converted light from light of the fundamental frequency. Frequency-conversion optics 38 preferably comprise a third-harmonic generator (THG) 40 and a second harmonic generator (SHG) 44 in mutual optical communication. THG 40 and SHG 44 are in thermal contact with a conventional temperature controller (not shown) which controls the macroscopic temperatures within THG 40 and SHG 44. THG 40 and SHG 44 are preferably lithium triborate (LBO) crystals. Other materials potentially suitable for frequency-conversion optics in a system of the present invention include BBO (barium β-borate), KTP (KTiOPO$_4$), lithium niobate (LiNbO$_3$), KDP and isomorphs, and lithium iodate (LiIO$_3$) crystals, as well as quasi-phase-matched materials such as periodically-poled lithium tantalate. Other suitable frequency conversion optics include frequency doublers, frequency triplers, frequency mixers, and parametric converters such as optical parametric oscillators (OPO), amplifiers (OPA), and generators (OPG).

Fundamental-frequency light generated by gain medium 30 is incident on SHG 44. Some of the fundamental-frequency light passes through SHG 44 unimpeded, while some is frequency-converted by SHG 44 into second harmonic light at 532 nm. The second harmonic light is reflected by mirror 24c, passes through SHG 44, and is incident on THG 40. Additional second harmonic light is generated by SHG 44 from fundamental-frequency light reflected by mirror 24c. Fundamental and second harmonic light are incident on THG 40. THG 40 generates third harmonic light at 355 nm, by mixing the incident fundamental and second harmonic light. Light of the second and third harmonic frequencies passes through mirror 24b and is incident on a mirror 36. Mirror 36 has a high reflectivity at the third harmonic and is AR-coated at the second harmonic. Mirror 36 deflects the incident third harmonic light and transmits the incident second harmonic light toward a beam dump 38, to generate a light beam 48 consisting of third harmonic light. Light beam 48 is the useful output of laser 20.

A Q-switch 34 is used to generate high-intensity light pulses of fundamental light within cavity 22. Q-switch 34 is situated within cavity 22, in an optical path between gain medium 30 and mirror 24a. Q-switch 34 introduces dynamically controllable optical losses to fundamental frequency light within cavity 22. Q-switch 34 acts as a gain control element for cavity 22. The optical losses introduced by Q-switch 34 are used to switch laser 20 between lasing and non-lasing states. If the total loss within cavity 22 is higher than the gain, laser 20 does not lase and population inversion accumulates within gain medium 30. By decreasing the loss within laser 20 to bring laser 20 above its lasing threshold, the accumulated population inversion can be released as a high-intensity light pulse. Q-switch 34 is preferably an acousto-optic modulator (AOM). Other well-known active Q-switches such as electro-optic modulators or mechanical devices may also be used. For information on Q-switching see for example Saleh and Teich, *Fundamentals of Photonics*, John Wiley and Sons, Inc., p. 523–531.

Preferably, dynamic loss control within cavity 22 is achieved using Q-switch 34 alone, while maintaining the pumping of gain medium 30 constant. The level of pumping provided by pump 32 may also be used to control the gain within cavity 22, particularly during periods of operation of laser 20 in a continuous-wave (c.w.) mode. Control electronics 50 are in electrical communication with pump 32 and Q-switch 34. Control electronics 50 determine the level of pumping provided by pump 32, and the losses introduced by Q-switch 34. Control electronics 50 are preferably connected to user electronics (not shown) through a connection 52.

Figure 2:
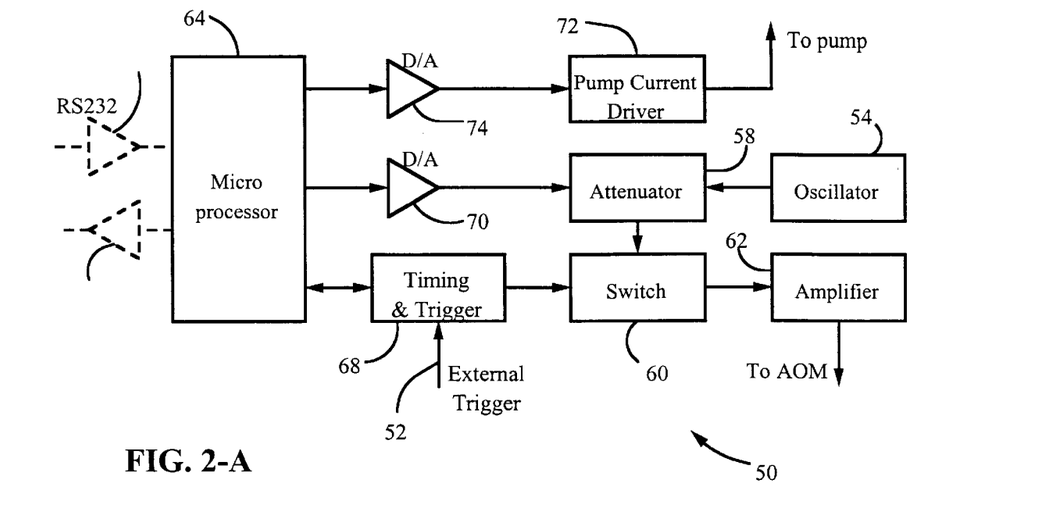

FIG. 2-A is a schematic diagram of control electronics 50. For clarity, the following description focuses on exemplary radio-frequency (RF) modulation components suitable for controlling an AOM. Suitable electronics for controlling other types of Q-switches such as electro-optic modulators will be readily apparent to the skilled artisan. For example, the driving signal for an electro-optic modulator is an applied voltage rather than an RF signal. Preferably, control electronics 50 comprise an RF oscillator 54 for generating an RF driving signal for driving AOM 34. Oscillator 54 is in electrical communication with AOM 34 through an RF attenuator 58, an RF switch 60, and an RF amplifier 62. Attenuator 58 dynamically controls the amplitude of the driving signal. Switch 60 switches the driving signal on and off. Amplifier 62 amplifies the driving signal.

Attenuator 58 and switch 60 are dynamically controlled by a microprocessor 64 and timing/trigger electronics 68. Attenuator 58 is connected to microprocessor 64 through a digital-to-analog (DIA) converter 70. Switch 60 is connected to timing trigger electronics 68, which are in turn connected to microprocessor 64 arid to user electronics. Microprocessor 64 may be further connected to the user electronics through a connection 65. Microprocessor 64 controls the attenuation imparted on the driving signal by attenuator 58. Timing/trigger electronics 68 control the on/off state of switch 60, and send pulse timing information to microprocessor 64.

Control electronics 50 further comprise a pump current driver 72 in electrical communication with pump 32. Pump driver 72 is connected to microprocessor 64 through a D/A converter 74. Through pump driver 72, microprocessor 64 can control the pumping of gain medium 30. The pumping amplitude is preferably held constant throughout a given period of operation of laser 20, but may generally be varied if desired.

FIG. 2-B shows a schematic diagram of timing/trigger electronics 68. Timing/trigger electronics 68 comprise window timing electronics 80 connected through the output of a trigger selection switch (switching electronics) 82 to connection 52 or an internal timing generator (triggering electronics) 86. Timing generator 86 and trigger selection switch 52 are connected to and controlled by microprocessor 64. Interval timing measurement electronics 88 are also connected to the output of trigger selection switch 82.

Under the control of microprocessor 64, trigger selection switch 82 selects external or internal trigger signals for laser 20. Preferably, laser 20 receives external trigger signals from the user electronics through connection 52. Alternatively, internal timing generator 86 generates trigger signals for driving the pulsed operation of laser 20. Window timing electronics 80 controls the on/off state of RF switch 60. RF switch 60 is turned off for a predetermined period of time after window timing electronics 80 receives a trigger signal, to allow laser 20 to emit a pulse. RF switch is otherwise on, allowing a driving signal (if any) from attenuator 58 to reach AOM 34. Interval timing measurement electronics 88 measures the time period elapsed since the latest received pulse trigger is received by laser 20, or equivalently since the latest pulse is emitted by laser 20, and compares that time period with a threshold determined by previous interpulse time separation(s). The threshold is preferably a real multiple (e.g. 110%) of the immediately previous interpulse time separation. If the elapsed time period exceeds the threshold, timing measurement electronics 88 signals microprocessor 64 to initiate operation of laser 20 in a continuous-wave (c.w.) mode. When a new pulse trigger is received, timing measurement electronics 88 signals microprocessor 64 to maintain or initiate operation of laser 20 in a Q-switched mode.

Initiating c.w. operation is preferably achieved by continuously ramping up the attenuation of attenuator 58, thus ramping down the driving signal to Q-switch 34 from its maximal level for Q-switched operation to a predetermined c.w. level. Initiating or maintaining Q-switched operation is preferably achieved by setting the attenuation of attenuator 58 to its minimal level for Q-switched operation, thus setting the driving signal to Q-switch 34 to its maximal level for Q-switched operation. The output of pump current driver 72 is preferably unchanged in time, but may generally be modulated to achieve desired gain levels within cavity 22. For example, the output of pump current driver 72 may be ramped down upon initiation of c.w. operation.

Operation Illustration

Figure 3:
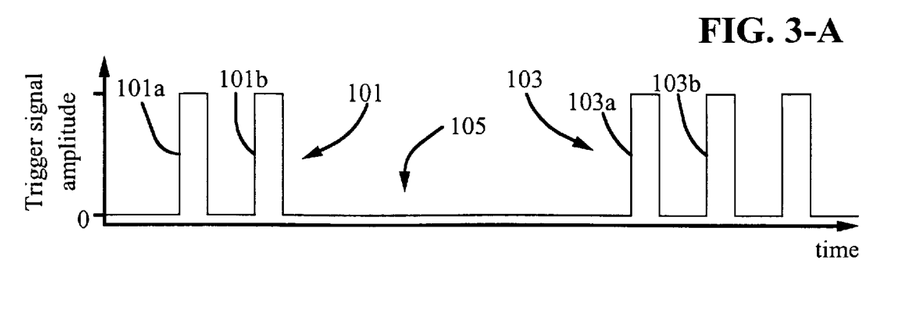

FIG. 3-A through 3-D illustrate schematically, by way of example and not necessarily of limitation, the variation in time of various system parameters for consecutive periods of Q-switched operation separated by a period of c.w. operation. FIG. 3-A shows consecutive first and second pulse trigger sequences 101, 103 received by control electronics 50 through external connection 52. The pulse repetition rates for sequences 101, 103 are generally on the order of <1 kHz to hundreds of kHz, typically on the order of kHz to tens of kHz. Sequences 101, 103 are separated by a pause period 105 substantially longer (e.g. an order of magnitude) than the interpulse time separation of sequence 101. FIGS. 3-B through 3-D illustrate the driving signal to Q-switch 34, the intracavity power at the fundamental frequency, and the output power at the third harmonic, respectively, for the time periods of sequences 101, 103 and pause 105.

During Q-switched operation, attenuator 58 is set to a constant, minimal operating attenuation level. As a first pulse 101a is received by control electronics 50, window timing electronics 80 set switch 60 to its "off" state, preventing the driving signal generated by oscillator 54 from reaching Q-switch 34. The driving power to Q-switch 34 then goes to a minimal level 107, preferably zero (FIG. 3-B), allowing lasing within cavity 22 and release of the population inversion within gain medium 30 as a high-intensity intracavity light pulse 109 at the fundamental frequency (FIG. 3-C). Pulse 109 is frequency-converted by frequency conversion optics 38, generating a pulse 111 of light at the third harmonic (FIG. 3-D).

Upon arrival of pulse trigger 101a, interval timing measurement electronics 88 signal microprocessor 64 to maintain Q-switched operation of laser 20. After a predetermined period of time following arrival of pulse trigger 101a, window timing electronics 80 set switch 60 to its "on" state, thus inhibiting lasing within cavity 22 and allowing accumulation of population inversion within gain medium 30. The above-described process is repeated for a subsequent pulse trigger 101b.

After pulse trigger 101b, the time period elapsed since arrival of pulse trigger 101b exceeds the threshold of interval timing measurement electronics 88. The threshold can be for example 110% of the time period elapsed between the arrivals of pulse triggers 101a and 101b. Timing measurement electronics 88 then signals microprocessor 64 to initiate c.w. operation of laser 20. Microprocessor 64 ramps down the attenuation of attenuator 58, as illustrated by arrow 113 in FIG. 3-B. When the loss becomes less than the gain within cavity 22, laser 20 begins lasing in c.w. mode at increasing intensity, as illustrated by arrow 115 in FIG. 3-C. The output of laser 20 at the third harmonic may also rise, as illustrated by arrow 117 in FIG. 3-D, but typically only to a practically negligible level.

After ramp-down, microprocessor 64 preferably stabilizes the attenuation level of attenuator 58 to a constant c.w. operating level. The c.w. attenuation level can be chosen such that the heating of frequency-conversion optics 38 during c.w. operation substantially matches or slightly exceeds the average heating anticipated for the subsequent sequence of pulse triggers 103. The c.w. attenuation level can also be chosen to be maximal, such that Q-switch 34 is essentially off. The c.w. attenuation level need not generally be constant.

As a first pulse trigger 103a (FIG. 3-A) of sequence 103 is received by laser 20, interval timing measurement electronics 88 signals microprocessor 64 to initiate Q-switched operation of laser 20. In anticipation of a second pulse trigger 103b, microprocessor 64 lowers the attenuation of attenuator 58 to its minimal Q-switched operating level, turning Q-switch 34 "on" for a time period $\tau$ before arrival of pulse trigger 103b. Turning Q-switch 34 on is used to provide suitable accumulation of population inversion within gain medium 30, for increasing the amplitude of light emitted in response to pulse trigger 103b. The period $\tau$ is preferably similar to the interpulse spacing for sequence 103. The process described above with respect to sequence 101 is then repeated for sequence 103.

Discussion

Efficient frequency-conversion in conventional harmonic-generation elements is facilitated by ensuring that the phase-velocities of the fundamental and frequency-converted light are matched, a condition known as the "phase-matching" condition. If the phase-matching condition is met, the waves of frequency-converted light generated in different spatial regions of the frequency-conversion optics add coherently on a macroscopic scale. Phase-matching allows increased peak pulse powers and pulse energies.

The efficiency of phase-matching depends on the localized temperature profile within the frequency-conversion optics. The localized temperature profile is determined in large part by the optical heating of the frequency-conversion optics during the normal operation of the laser. The optically-determined localized temperature profile is distinct from the macroscopic non-localized temperature of the frequency-conversion optics, which is typically primarily determined by a conventional temperature controller in thermal contact with the frequency-conversion optics. For a frequency-converted laser having frequency-conversion optics optimized for steady-state pulsed operation, turning the laser off before a desired period of pulsed operation may lead to loss of optimal phase matching at the beginning of the period, until the operational temperature profile within the frequency-conversion optics is restored. The light pulses at the beginning of the period are then initially relatively small, and increase in time on a pulse-recovery timescale which is typically much larger than the interpulse time spacing. The pulse-recovery timescale is presumably determined by the time constant characterizing the localized heating of the frequency-conversion optics.

Operating the laser in a c.w. mode serves to optically heat the frequency-conversion optics in a localized manner, so as to maintain within the frequency-conversion optics a temperature profile similar to the profile during a subsequent period of pulsed operation. Operating the laser in a c.w. mode thus serves to reduce the pulse recovery time for the subsequent period of pulsed operation. Because of the non-linearity of frequency-conversion processes, the output of frequency-converted light is usually negligible during c.w. operation. Thus, operating the laser in a c.w. mode effectively turns off the laser output without shutting off lasing within the resonant cavity.

The c.w. intracavity light intensity can be set to a predetermined constant level, or can be optimized according to particular system parameters (e.g. average power) anticipated for the subsequent period of pulsed operation. The c.w. level can be modulated through the level of pumping of the gain medium, and/or the optical losses introduced in the cavity by the Q-switch and/or other lossy elements. Clearly, the c.w. level need not generally be constant in time.

Abruptly decreasing intracavity optical losses to initiate c.w. operation may lead to undesirable light emission by the laser. Gradually ramping down the cavity losses allows maintaining the fundamental light intensity within the laser relatively stable, and does not produce a significant output pulse for the given application. The timescale for the ramp-down is preferably less than or equal to the interpulse spacing (e.g. 1 ms for a 1 kHz repetition rate), and at least on the order of the cavity lifetime (e.g. on the order of $\mu$s). The ramp-down is preferably performed over a timescale on the order of the interpulse spacing.

Operating the laser in a c.w. mode has the further advantage that it allows expending excess population inversion that would otherwise accumulate in a continuously-pumped gain medium. Such excess population inversion may lead to a high-intensity, potentially deleterious first pulse after a long period in which lasing is inhibited. In a material-processing application, a large first pulse may cause damage in a material or sample to be processed by the laser. Operation in a c.w. mode effectively causes suppression of the first pulse of the subsequent period of operation of the laser in a Q-switched mode. Operation in c.w. mode can thus be thought of as operation in a first-pulse suppression mode. Operating the laser in a c.w. mode can also alleviate the need for specialized electronics for suppressing the first pulse. Such specialized electronics may require specific signals from the user to the control electronics, and may increase system complexity.

Initiating operation of the laser in a pulse-suppression mode (e.g. c.w. mode) solely based on information contained in pulse trigger signals provided by the user can allow a simplification in the control electronics. As described above, such initiation can be performed by comparing the time elapsed since emission of the latest pulse (or receipt of the latest pulse trigger) with a predetermined threshold. The threshold can be a real multiple of the interpulse spacing immediately prior to the latest pulse, some time-average function of a number of interpulse spacings preceding the latest pulse, or a fixed threshold.

If operation of the laser in c.w. mode depletes the population inversion within the gain medium to a low enough level, the first pulse of the subsequent firing sequence may be lower than desired. The intracavity losses can then be increased (e.g. the laser can be turned off, or the c.w. level decreased) for a period $\tau$ immediately before emission of the first pulse of the subsequent firing sequence, to allow accumulation of population inversion within the gain medium. A time period $\tau$ substantially equal to the subsequent interpulse spacing is usually sufficient for allowing accumulation of suitable population inversion. Turning off the laser for the period $\tau$ does not substantially affect the thermal profile within the frequency-conversion optics if $\tau$ is much shorter (e.g. an order of magnitude shorter) than the pulse recovery time.

Example

The following example is intended to illustrate aspects of a particular implementation of the invention, and should not be construed to limit the invention.

Figure 4:
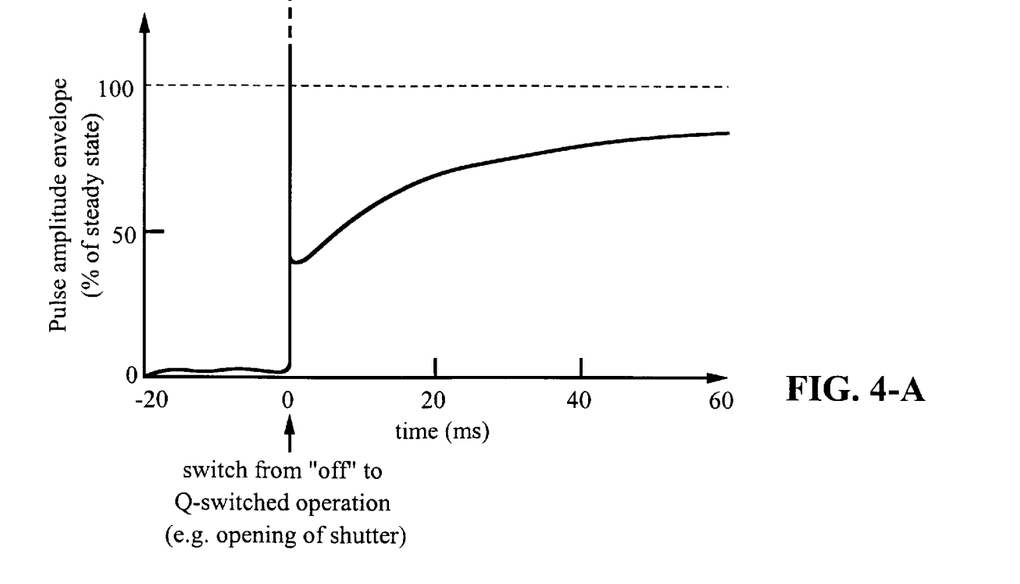

A laser similar to that shown in FIG. 1 was used to evaluate pulse recovery times after periods of operation in an "off" state and in c.w. mode. LBO crystals were used for the SHG and THG to generate pulses of 355 nm light. The pulse repetition rate was 18 kHz, which corresponds to an interpulse spacing on the order of 50 $\mu$s. The RF power to the AOM was varied between 0 and ~6 W during Q-switched operation. FIG. 4-A illustrates the pulse amplitude envelope observed after a period of operation of the laser with a shutter similar to shutter 25 in a closed state. The shutter was opened at time zero. The first pulse was substantially larger than the steady state value, and the pulse amplitude reached 90% of the steady state value in over 50 ms. FIG. 4-B illustrates the pulse amplitude envelope after a period of operation of the laser in a c.w. mode, achieved by turning the AOM off. Q-switched operation was initiated at time zero. The first pulse was reduced, and the pulse amplitude reached 90% of the steady state value substantially instantaneously. The average UV output power was ~4 w during Q-switched operation, and <0.3 mW during c.w. operation.

The preceding description illustrates by way of example particular embodiments of the present invention. It will be clear to one skilled in the art that the above embodiments may be altered in many ways without departing from the scope of the invention. For example, the resonant cavity need not be linear or folded. Ring cavities can be used. Single-mode or multi-transverse- or multi-longitudinal-mode laser operation can be employed. A laser of the present invention need not be limited to the particular frequencies illustrated above. Various frequencies are suitable for the fundamental light and for the useful output. The laser generally need not generate third harmonic light. For example, the laser can be an intracavity frequency-doubled laser. The gain medium can be end-pumped. There is considerable freedom in the choice of control electronics components, logic, and arrangements suitable for a system and method of the present invention. For example, the amplitude of the Q-switch driving signal can be controlled using discrete analog and/or digital components instead of a microprocessor. A variable gain amplifier may be used instead of an attenuator for adjusting the driving signal amplitude. Internal triggering may be employed. The timing electronics may measure amplitudes of timing signals generated by processing external trigger signals. Timing electronics including optical components in optical communication with the gain medium may measure optical signal amplitudes rather than trigger signal amplitudes. Accordingly, the scope of the invention should be determined by the following claims and their legal equivalents.

What is claimed is:

1. A method of generating pulsed frequency-converted light comprising the steps of:
    a) operating an intracavity frequency-converted laser having frequency conversion optics in a continuous-wave mode during a continuous-wave operation period for optically heating said frequency conversion optics;
    b) operating said intracavity frequency-converted laser in a pulsed-wave mode by using a Q-switch during a pulsed operation period to generate light pulses of said frequency-converted light;
   whereby said step of operating in said continuous-wave mode during said continuous-wave operation period reduces a pulse recovery time during said pulsed operation period.

2. The method of claims 1, further comprising a step of decreasing a net optical gain within said intracavity frequency-converted laser prior to operating in said pulsed-wave mode, said step of decreasing having a timescale faster than a thermal-recovery timescale of said frequency conversion optics, thereby increasing an amplitude of a first pulse produced during said pulsed operation period.

3. The method of claim 2, wherein said step of decreasing said net optical gain is performed by said Q-switch.

4. The method of claim 1, wherein said step of operating in said pulsed-wave mode comprises generating light pulses of a second harmonic frequency from light pulses of a fundamental frequency.

5. The method of claim 4, wherein said step of operating in said pulsed-wave mode further comprises generating light pulses of a third harmonic frequency from said light pulses of said second harmonic frequency and said light pulses of said fundamental frequency.

6. The method of claim 1, further comprising the steps of:
   a) determining a time period elapsed since emission of a latest light pulse by said intracavity frequency-converted laser; and
   b) commencing operation in said continuous-wave mode when said time period exceeds a predetermined threshold.

7. The method of claim 6, wherein said step of commencing operation in said continuous-wave mode comprises ramping up a net optical gain within said intracavity frequency-converted laser.

8. The method of claim 7, wherein said step of ramping up said net optical gain comprises ramping down an optical loss introduced in said intracavity frequency-converted laser by said Q-switch.

9. A method of generating pulses of light of a harmonic of a fundamental frequency in an intracavity frequency-converted laser, said method comprising the steps of:
   a) providing said intracavity frequency-converted laser with:
      1) a resonant cavity supporting lasing of said fundamental frequency;
      2) a gain medium;
      3) a frequency conversion optics;
      4) a Q-switch situated within said resonant cavity; and
      5) control electronics for controlling said Q-switch;
   b) using said gain medium to generate light of said fundamental frequency;
   c) using said frequency conversion optics to generate light of said harmonic from light of said fundamental frequency; and
   d) using said control electronics to control an optical loss introduced in said resonant cavity by said Q-switch to operate said intracavity frequency-converted laser in a continuous-wave mode during a continuous-wave operation period to optically heat said frequency conversion optics, and to operate said intracavity frequency-converted laser in a pulsed-wave mode during a pulsed operation period to generate said pulses of light of said harmonic;
   whereby operation in said continuous-wave mode during said continuous-wave operation period reduces a pulse recovery time during said pulsed operation period.

10. The method of claim 9, further comprising the step of increasing said optical loss prior to said pulsed operation period on a timescale faster than a thermal-recovery timescale of said frequency conversion optics for increasing an amplitude of a first pulse during said pulsed operation period.

11. The method of claim 9, wherein said step of operating said intracavity frequency-converted laser in said pulsed-wave mode comprises generating a second harmonic frequency from said fundamental frequency.

12. The method of claim 11, wherein said step of operating said intracavity frequency-converted laser in said pulsed-wave mode further comprises generating a third harmonic from said second harmonic and said fundamental frequency.

13. The method of claim 9, further comprising the steps of:
   a) determining a time period elapsed since emission of a latest light pulse by said intracavity frequency-converted laser; and
   b) commencing operation in said continuous-wave mode when said time period exceeds a predetermined threshold.

14. The method of claim 13, wherein said step of commencing operation in said continuous-wave mode comprises ramping up a net optical gain within said intracavity frequency-converted laser.

15. The method of claim 14, wherein said step of ramping up said net optical gain comprises ramping down said optical loss introduced in said resonant cavity by said Q-switch.

16. A method of generating pulsed frequency-converted light comprising the steps of:
   a) operating said intracavity frequency-converted laser having frequency conversion optics in a pulsed-wave mode by using a Q-switch during a pulsed operation period to generate light pulses of said frequency-converted light;
   b) operating said intracavity frequency-converted laser in a continuous-wave mode during a continuous-wave operation period, said continuous-wave operation period preceding said pulsed operation period, thereby reducing a pulse recovery time in said pulsed-wave mode and reducing an amplitude of a first of said light pulses of said frequency-converted light.

17. A method of operating a pulsed frequency-converted laser, comprising the steps of:
   a) providing a frequency conversion optics for generating frequency-converted light;
   b) providing a Q-switch for operating said pulsed frequency-converted laser in a pulsed-wave mode during a pulsed operation period;
   c) performing local optical heating of said frequency conversion optics before operating said pulsed frequency-converted laser in said pulsed-wave mode, thereby reducing a pulse recovery time in said pulsed-wave mode.

18. The method of claim 17, wherein said local heating is performed by operating said pulsed frequency-converted laser in a continuous-wave mode.

19. An intracavity frequency-converted laser comprising:
   a) a resonant cavity supporting lasing of a fundamental frequency;
   b) a gain medium situated within said resonant cavity for generating light of said fundamental frequency;
   c) frequency-conversion optics situated within said resonant cavity for generating light of a harmonic of said fundamental frequency;
   d) a Q-switch situated within said resonant cavity for controlling an optical loss within said resonant cavity; and
   e) control electronics for controlling said Q-switch to operate said intracavity frequency-converted laser in a continuous-wave mode during a continuous-wave operation period to optically heat said frequency conversion optics, and to operate said intracavity frequency-converted laser in a pulsed-wave mode during a pulsed operation period to generate pulses of light of said harmonic, whereby operation in said continuous-wave mode during said continuous-wave operation period reduces a pulse recovery time during said pulsed operation period.

20. The intracavity frequency-converted laser of claim 19, wherein said control electronics comprise amplitude modulation electronics in electrical communication with said Q-switch for increasing said optical loss prior to said pulsed-wave mode on a timescale faster than a thermal-recovery timescale of said frequency conversion optics, for increasing an amplitude of a first pulse during said pulsed-wave mode.

21. The intracavity frequency-converted laser of claim 19, wherein said frequency conversion optics comprise a second harmonic generator for generating a second harmonic from said fundamental frequency.

22. The intracavity frequency-converted laser of claim 21, wherein said frequency conversion optics further comprise a third harmonic generator in optical communication with said second harmonic generator, for generating a third harmonic from said second harmonic and said fundamental frequency.

23. The intracavity frequency-converted laser of claim 19, wherein said control electronics comprise:
   a) timing electronics for determining a time period elapsed since emission of a latest pulse by said intracavity frequency converted laser; and
   b) amplitude modulation electronics in communication with said timing electronics and said Q-switch, for controlling said Q-switch to commence operation in said continuous-wave mode when said time period exceeds a predetermined threshold.

24. The intracavity frequency-converted laser of claim 19, wherein said control electronics comprise:
   a) timing electronics for determining a time period elapsed since emission of a latest pulse by said intracavity frequency converted laser;
   b) amplitude modulation electronics; and
   c) a gain control element in communication with said amplitude modulation electronics and said timing electronics, for ramping up an optical gain within said resonant cavity when said time period exceeds a predetermined threshold.

25. The intracavity frequency-converted laser of claim 24, wherein said gain control element comprises said Q-switch.

26. The intracavity frequency-converted laser of claim 24, wherein said gain control element comprises an optical pump for optically pumping said gain medium.

27. The intracavity frequency-converted laser of claim 19, wherein said Q-switch comprises an acousto-optic modulator and said control electronics comprise:
   a) a radio-frequency oscillator in electrical communication with said acousto-optic modulator, for generating a radio-frequency signal for said acousto-optic modulator;
   b) a radio-frequency attenuator in communication with said radio-frequency oscillator and said acousto-optic modulator, for controlling an amplitude of said radio-frequency signal;
   c) a radio-frequency switch in communication with said radio-frequency oscillator and said acousto-optic modulator, for switching said radio-frequency signal on and off; and
   d) a radio-frequency amplifier in communication with said oscillator and said acousto-optic modulator, for amplifying said radio-frequency signal.

28. The intracavity frequency-converted laser of further comprise:
   a) timing electronics for determining a time period elapsed since emission of a latest pulse by said intracavity frequency-converted laser; and
   b) a microprocessor in communication with said timing electronics said attenuator and said switch, for:
      1) receiving a timing signal indicative of said time period from said timing electronics;
      2) computing a desired amplitude of said radio-frequency signal and a desired state of said switch from said timing signal; and
      3) controlling said attenuator and said switch to produce said desired amplitude and said desired state.

29. A pulsed intracavity frequency-converted laser comprising:
   a) a Q-switch for operating said intracavity frequency-converted laser in a pulsed-wave mode;
   b) frequency conversion optics for generating frequency-converted light from light of a fundamental frequency during said pulsed wave mode; and
   c) a gain medium in optical communication with said frequency conversion optics, for generating light of said fundamental frequency during said pulsed-wave mode, and for optically heating said frequency conversion optics before said pulsed-wave mode, thereby facilitating phase-matching within said frequency conversion optics during said pulsed-wave mode.

30. A Q-switched intracavity frequency-converted laser comprising:
   a) a resonant cavity for supporting lasing of a fundamental frequency;
   b) a gain medium situated within said resonant cavity, for generating light of said fundamental frequency;
   c) frequency conversion optics situated within said resonant cavity, for generating frequency-converted light from light of said fundamental frequency; and
   d) a Q-switch situated within said resonant cavity, for controlling an optical loss within said resonant cavity to operate said resonant cavity in a continuous-wave mode during a continuous-wave operation period to optically heat said frequency conversion optics, and to operate said intracavity frequency-converted laser in a pulsed-wave mode during a pulsed operation period to generate pulses of said frequency-converted light, whereby operation in said continuous-wave mode during said continuous-wave operation period reduces a pulse recovery time during said pulsed operation period.

31. A Q-switched intracavity frequency-converted laser comprising:
   b) a Q-switch for operating said intracavity frequency-converted laser in a pulsed-wave mode during a pulsed operation period to generate pulses of frequency-converted light; and
   c) a means for operating said intracavity frequency-converted laser in a continuous-wave mode during a continuous-wave operation period prior to said pulsed operation period, thereby reducing a pulse recovery time during said pulsed operation period.

* * * * *